3,474,461
POLYMERIZATION PROCESS FOR OLEFINICALLY UNSATURATED MONOMERS WITH METAL PEROXIDE INITIATORS
Takayuki Otsu, Fuse-shi, and Tadashi Nakata, Ibaraki-shi, Japan, assignors to Shionogi & Co., Ltd., Osaka-shi, Japan
No Drawing. Filed July 6, 1966, Ser. No. 563,025
Claims priority, application Japan, July 9, 1965, 40/41,383
Int. Cl. C08f 3/30, 15/06; C08d 3/06
U.S. Cl. 260—92.8         6 Claims

ABSTRACT OF THE DISCLOSURE

A process for the polymerization of the polymerizable alpha olefinically unsaturated organic compounds using one of several metal peroxides and in the further presence of water or a reductive metal salt or an acidic metal halide, the preferred metal peroxide being nickel peroxide.

---

The present invention relates to a polymerization process. More particularly, it relates to an improved process for polymerizing one or more kinds of polymerizable compounds having ethylenic unsaturation (hereinafter referred to as "polymerizable monomers").

Hitherto, there has been known that transition metal peroxides can initiate the polymerization of polymerizable monomers and produce stereospecific polymers under certain conditions. However, the polymerization proceeds in a low and unsatisfactory rate of polymerization, especially at a low temperature, to give polymers in poor yields.

In order to improve the catalytic activity of transition metal peroxides in polymerization, various attempts have been made. As the result, it has now been discovered that, when the polymerization of polymerizable monomers by the aid of a transition metal peroxide is effected in water, there are produced polymers in good yields. It has also been discovered that, when the polymerization of polymerizable monomers using a transition metal peroxide is executed in the presence of a reductive metal salt, there are given polymers in favorable yields. It has further been discovered that, when the polymerization of polymerizable monomers by the use of a transition metal peroxide is performed in the presence of an acidic metal halide, there are obtained polymers in excellent yields. The present invention is based on these discoveries.

A basic object of the present invention is to embody an improved process for preparing polymers in good yields. Another object of this invention is to embody a process for improving the catalytic activity of transition metal peroxides. A further object of the invention is to embody a catalytic species of polymerization which can induce the polymerization of one or more kinds of polymerizable monomers to polymers with a high rate of polymerization. These and other objects will be apparent to those conversant with the art to which the present invention pertains from the subsequent description.

According to the present invention, the polymerization of one or more kinds of polymerizable monomers may be effected in the presence of a transition metal peroxide in water. Alternatively, the polymerization may be executed in the presence of a transition metal peroxide together with a reductive metal salt. Alternatively, the polymerization may be performed in the presence of a transition metal peroxide together with an acidic metal halide. Thus, the present invention includes three embodiments for attaining the said objects.

As the polymerizable monomers, there may be exemplified the following compounds: vinyl halides (e.g. vinyl chloride, vinyl bromide, vinyl fluoride), vinylidene halides (e.g. vinylidene chloride, vinylidene bromide, vinylidene fluoride), vinyl ethers (e.g. vinyl methyl ether, vinyl ethyl ether, divinyl ether), vinyl esters (e.g. vinyl formate, vinyl acetate, vinyl acrylate, vinyl butyrate, vinyl crotonate), vinyl ketones (e.g. methyl vinyl ketone, ethyl vinyl ketone, methyl isopropenyl ketone), olefins (e.g. ethylene, propylene, butene-1, isobutylene), conjugated diolefins (e.g. butadiene-1,3, 2,3-dimethylbutadiene-1,3, 2-ethylbutadiene-1,3, isoprene, 4-methylhexadiene-1,3, 2-methylpentadiene-1,3, 2 - isopropylbutadiene-1,3), acrylonitrile, acrylic acid, acrylic esters (e.g. methyl acrylate, ethyl acrylate, propyl acrylate), acrylamide, methacrylic acid, methacrylic esters (e.g. methyl methacrylate, ethyl methacrylate, propyl methacrylate), methacrylamide, styrene, styrene derivatives, vinylpyridine.

As the transition metal peroxides, there should be used the peroxides of transition metals (e.g. nickel, cobalt, copper, zinc, magnesium, cadmium, manganese) freshly prepared by treating transition metal salts such as transition metal sulfates and transition metal nitrates with strong oxidizing agents such as alkali metal hypohalites (e.g. sodium hypochlorite, potassium hypochlorite, sodium hypobromite) and alkali metal persulfates (e.g. sodium persulfate, potassium persulfate) in an aqueous alkaline medium, collecting the precipitate and drying the collected material. Of various transition metal peroxides, nickel peroxide is the most preferred. Accordingly, the appearance and property of nickel peroxide will be hereinafter illustrated in detail. The nickel peroxide employed in the present invention is a black fine powder containing firmly bonded water and capable of liberating iodine from potassium iodide solution. Although the exact chemical structure has not yet been confirmed, the results of analysis make it possible to give a molecular formula corresponding to $Ni_4O_6H_{11}$. The nickel peroxide contains about $0.3 \times 10^{-2}$ to about $0.4 \times 10^{-2}$ gram-atom of active oxygen per gram (determined by the iodine method). The catalytic activity is reduced gradually during storage and rapidly on heating. It should be noted that the active nickel peroxide herein described is an amorphous and non-stoichiometric compound, whereas nickel sesquioxide ($Ni_2O_3$) (usually called "nickel peroxide" on market) is crystalline and inactive. Thus, the use of freshly prepared nickel peroxide is essential.

Examples of the reductive metal salts include the following compounds: sodium thiosulfate, silver nitrate, cobaltous nitrate, nickel nitrate, cuprous sulfate, cadmium sulfate, cobaltous sulfate, ferrous sulfate, nickelous sulfate, silver chloride, ferrous chloride, nickelous chloride, silver bromide, cuprous bromide, cuprous iodide, cobaltous iodide, ferrous iodide, nickelous iodide, nickelous fluoride.

The acidic metal halides are intended to mean those halides which are known as Lewis acids and include, for instance, aluminum halides, gallium halides, indium halides, titanium halides, vanadium halides and other acidic halides of non-transition metals. Of these acidic metal halides, aluminum halides are preferred. Aluminum chloride is particularly preferred, followed by aluminum bromide and the other aluminum halides.

In an embodiment of the present invention, the polymerization is effected by contacting one or more kinds of polymerizable monomers with the transition metal peroxide and water. In this case, water itself is served as the reaction medium.

In another embodiment of this invention, the polymerization is executed by contacting one or more kinds of polymerizable monomers with the transition metal peroxide and the reductive metal salt. In this case, there may be used as the reaction medium an inert solvent, preferably water.

In another embodiment of the invention, the polymerization is performed by contacting one or more kinds of polymerizable monomers with the transition metal peroxide and the acidic metal halide. In this case, there may be used as the reaction medium an inert solvent, preferably a hydrocarbon such as benzene, toluene, xylene, hexane or heptane.

Common to the above embodiments, the existence of oxygen in the polymerization is not favorable. Thus, the polymerization should be conducted in the absence of oxygen. For instance, water is required to be deoxygenated prior to the use by passing through a column of ion exchange resin (e.g. Amberlite IRA 402) in nitrogen stream. Further, for instance, the reaction zone is evacuated and flushed with an inert gas such as nitrogen or argon. The temperature may range from about 0 to about 100° C. The convenient operating pressure is that which is created by the system and will vary depending upon the specific nature of polymerizable monomers, the solvent and their respective amounts. For convenience, such pressures are termed "autogenic" pressures. If desired, higher or lower pressures may be employed. When the reductive metal salt or the acidic metal halide is used, the amount may be widely varied with the object and condition of polymerization so that the temperature, rate and degree of polymerization are suitably regulated. In general, the ratio of the mole number of the reductive metal salt or the acidic metal halide to the active oxygen content (the unit being represented by O* g.-atom) in the transition metal peroxide may be less than 5.0.

When the polymerization is executed in water in the presence or absence of the reductive metal halide, there may be added an emulsifier to the reaction system. Examples of the emulsifier are potassium myristate, sodium laurate, sodium laurylsulfonate, sodium dodecylbenzenesulfonate, polyoxyethylenenonyl phenyl ether, etc.

At the completion of the polymerization, the reaction mixture is treated with a mineral acid (e.g. hydrochloric acid, hydrobromic acid, sulfuric acid, nitric acid) in a suitable solvent (e.g. water, methanol, ethanol) to dissolve the catalyst and precipitate the produced polymer.

The polymers prepared by the process of the present invention may be utilized for many important industrial applications. For instance, the poly(vinyl chloride) thus prepared may be characterized in possessing a high degree of polymerization and useful for the production of plastics provided with high impact strength and high tensile strength. Further, for instance, the polybutadiene thus prepared may be characterized in having a high content of cis-1,4 structure and useful for the production of rubber products provided with excellent resiliency and good abrasion resistance.

Practical embodiments of the present invention are shown in the following examples. In the examples, the active oxygen content of nickel peroxide is 0.0038 g.-atom/g. The number average degree of polymerization ($\overline{P}n$) is calculated by introducing into the Baysal's equation [B. Baysal et al.: J. Polymer Sci., 9, 171 (1952)] the value of the intrinsic viscosity determined by viscosity measurement of the polymer in chloroform solution at 25° C. The average degree of polymerization ($\overline{P}$) is calculated by introducing into the Sakurada's equation [I. Sakurada et al.: Kogyo Kagakuzasshi, 47, 133 (1944)] the value of the intrinsic viscosity determined by viscosity measurement of the polymer in nitrobenzene solution at 30° C. The J value (the parameter of the tacticity of the polymer) is determined according to the Goode's method [W. E. Goode: J. Polymer Sci., 46, 317 (1960)].

EXAMPLE 1

In a glass tube, there is charged a suspension of nickel peroxide (0.53 g.) in water (5 ml.), and methyl methacrylate (5 ml.) is added thereto. Then, the glass tube is repeatedly evacuated and flushed with nitrogen to eliminate oxygen. After sealing under reduced pressure, the glass tube is shaken at 30° C. for 4 hours. The reaction product is combined with a mixture of hydrochloric acid and methanol to dissolve the nickel peroxide. The separated polymer is collected by filtration, dried and dissolved in chloroform. The resultant solution is poured into methanol to precipitate the polymer. The polymer is collected by filtration and dried to give poly(methyl methacrylate) in 36.7% yield. $\overline{P}n$: 8,100. J. value: 94.1.

The polymerization is effected as above but using toluene in place of water to give poly(methyl methacrylate) in 1.54% yield. $\overline{P}n$: 1,700. J. value: 104.

EXAMPLE 2

In a glass tube, there is charged a mixture of nickel peroxide (0.53 g.), cobaltous sulfate heptahydrate (0.06 g.) and water (5 ml.), and methyl methacrylate (5 ml.) is added thereto. Then, the glass tube is repeatedly evacuated and flushed with nitrogen to eliminate oxygen. After sealing under reduced pressure, the glass tube is shaken at 30° C. for 40 hours. The reaction product is treated as in Example 1 to give poly(methyl methacrylate) in 62.1%. $\overline{P}n$: 7,900. J. value: 105.

The polymerization is effected as above but using another reductive metal salt in place of cobaltous sulfate heptahydrate. The results are shown in the following Table 1:

TABLE 1

| Reductive metal salt | | | | |
| --- | --- | --- | --- | --- |
| Chemical formula | Amount used, gram | Yield, percent | $\overline{P}n$ | J value |
| CdSO$_4$.2⅔ H$_2$O | 0.217 | 35.1 | 8,500 | 101 |
| FeSO$_4$.7 H$_2$O | 0.030 | 54.7 | 10,000 | 93 |
| CuSO$_4$.5 H$_2$O | 0.025 | 36.7 | 8,800 | 95 |
| NiSO$_4$.7 H$_2$O | 0.060 | 27.5 | 8,800 | 94 |
| Na$_2$S$_2$O$_3$ | 0.110 | 100 | 7,200 | 90 |
| AgNO$_3$ | 0.144 | 55.3 | 9,500 | 89 |

EXAMPLE 3

In a glass tube, there is charged a suspension of nickel peroxide (0.53 g.) in water (5 ml.), and acrylonitrile (5 ml.- is added thereto. Then, the glass tube is repeatedly evacuated and flushed with nitrogen to eliminate oxygen. After sealing under reduced pressure, the glass tube is shaken at 40° C. for 6 hours. The reaction product is combined with a mixture of hydrochloric acid and methanol to dissolve the nickel peroxide. The separated polymer is collected by filtration, dried and dissolved in dimethylformamide. The resultant solution is poured into methanol to precipitate the polymer. The polymer is collected by filtration and dried to give polyacrylonitrile in 11.5% yield.

The polymerization is effected as above but at 60° C. for 3 hours to give polyacrylonitrile in 97% yield.

The polymerization is effected as above but using toluene in place of water at 40° C. for 6 hours to give polyacrylonitrile in 3.3% yield.

EXAMPLE 4

In a glass tube, there is charged a suspension of nickel peroxide (0.53 g.) in water (5 ml.), and vinyl acetate (5 ml.) is added thereto. Then, the glass tube is repeatedly evacuated and flushed with nitrogen to eliminate oxygen. After sealing under reduced pressure, the glass tube is shaken at 40° C. for 3 hours. The reaction product is combined with a mixture of hydrochloric acid and methanol to dissolve the nickel peroxide. The separated polymer is collected by filtration and saponified with an alkali. The resulting mixture is poured into methanol. The precipitate is collected, by filtration and dried to give poly(vinyl alcohol) in 86.3% yield.

The polymerization is effected as above but using toluene in place of water. No polymerization proceeds.

EXAMPLE 5

In a glass tube, there is charged a suspension of nickel peroxide (1 g.) in water (5 ml.). After evacuation, liquefied vinyl chloride (5 ml.) is distilled therein under reduced pressure. The glass tube is sealed and then shaken at 60° C. for 18 hours. The reaction product is combined with a mixture of hydrochloric acid and methanol to dissolve the nickel peroxide. The separated polymer is collected by filtration, dried and dissolved in cyclohexanone. The resultant solution is poured into methanol to precipitate the polymer. The polymer is collected by filtration and dried to give poly(vinyl chloride) in 100% yield. $\bar{P}$: 3,000. IR absorbance ratio: $D_{638}/D_{690}=1.93$, $$D_{613}/D_{690}=2.02$$

The polymerization is effected as above but using toluene in place of water to give poly(vinyl chloride) in 32.5% yield. $\bar{P}$: 450. IR absorbance ratio:

$$D_{638}/D_{690}=2.30$$

$D_{613}/D_{690}=2.61$.

In this example, the regularity of the polymer is represented by the infrared absorbance ratio of $D_{638}/D_{690}$ and $D_{613}/D_{690}$. $D_{638}$, $D_{613}$ and $D_{690}$ are the absorbances of the bands appeared at 638, 613 and 690 cm.$^{-1}$ in the infrared spectrum, which are attributed respectively to the crystalline syndiotactic unit, the amorphous syndiotactic unit and the isotactic unit in the polymer chain.

EXAMPLE 6

The polymerization is effected as in Example 5 but for various times to give poly(vinyl chloride). The relationship between the reaction time and the yield of the polymer is shown in the following Table 2:

TABLE 2

| Reaction time (hour) | 0.5 | 1.0 | 1.4 | 2.1 | 3.2 | 5.0 | 6.0 | 7.0 |
|---|---|---|---|---|---|---|---|---|
| Yield, percent | 34.0 | 64.0 | 81.6 | 95.0 | 100 | 100 | 100 | 100 |

EXAMPLE 7

In a glass tube, there is charged a mixture of nickel peroxide (1 g.), sodium laurate (0.0643 g.) and water (5 ml.). After evacuation, liquefied vinyl chloride (5 ml.) is distilled therein under reduced pressure. The glass tube is sealed and then shaken at 60° C. for a certain time. The reaction product is treated as in Example 5 to give poly(vinyl chloride). The relationship between the reaction time and the yield of the polymer is shown in the following Table 3:

TABLE 3

| Reaction time (hour) | 0.5 | 0.75 | 1.0 | 1.5 | 2.0 | 2.5 | 3.0 |
|---|---|---|---|---|---|---|---|
| Yield, percent | 22.9 | 85.5 | 97.8 | 100 | 100 | 100 | 100 |

EXAMPLE 8

In a glass tube, there is charged a mixture of nickel peroxide (1 g.), an emulsifier and water (5 ml.). After evacuation, liquefied vinyl chloride (5 ml.) is distilled therein under reduced pressure. The glass tube is sealed and then shaken at 0 or 60° C. for a certain time. The reaction product is treated as in Example 5 to give poly(vinyl chloride). The results are shown in the following Table 4:

TABLE 4

| | Emulsifier | | Polymerization | | | | |
|---|---|---|---|---|---|---|---|
| Name | Amount used, (gram) | Temp., °C. | Time, hour | Yield, percent | $D_{630}/D_{690}$ | | $\bar{P}$ |
| Potassium myristate | 0.0166 | 60 | 3 | 57.1 | 1.70 | | [1] 2,100 |
| Sodium laurate | 0.067185 | 60 | 3 | 100 | 1.80 | | [1] 2,300 |
| Sodium dodecylbenzenesulfonate | 0.0040075 | 60 | 10 | 21.9 | 1.78 | | [2] 750 |
| Sodium laurylsulfonate | 0.03235 | 60 | 8 | 91.5 | 1.82 | | [2] 1,800 |
| Polyoxyethylenenonyl phenyl ether [3] | 0.00067 | 60 | 8 | 49.5 | 1.62 | | [2] 1,100 |
| Potassium myristate | 0.0166 | 0 | 9 | 5.71 | 2.37 | | [2] 350 |
| Sodium laurate | 0.067185 | 0 | 9 | 11.63 | 2.43 | | [2] 310 |
| Sodium dodecylbenzenesulfonate | 0.0040075 | 0 | 18 | 7.62 | 2.20 | | [2] 430 |
| Sodium laurylsulfonate | 0.03235 | 0 | 18 | 11.12 | 2.23 | | |
| Polyoxyethylenenonyl phenyl ether [3] | 0.00067 | 0 | 18 | 11.12 | 2.28 | | [2] 240 |

[1] The polymer is soluble in nitrobenzene.
[2] The data is determined for the nitrobenzene soluble fraction of the product.
[3] The molecular weight is 644.84

EXAMPLE 9

In a glass tube, there is charged a suspension of nickel peroxide (1 g.) in water (5 ml.). After evacuation, liquefied butadiene (5 ml.) is distilled therein under reduced pressure. The glass tube is sealed and then shaken at 60° C. for 20 hours. The reaction product is combined with a mixture of hydrochloric acid and methanol to dissolve the nickel peroxide. The separated polymer is collected by filtration, dried and dissolved in carbon disulfide. The resultant solution is poured into methanol to precipitate the polymer. The polymer is collected by filtration and dried to give polybutadiene in 13.31% yield. The infrared analysis shows that the polymer consists of 69.76% trans-1,4 structure, 19.62% cis-1,4 structure and 10.62% 1,2 structure.

The polymerization is effected as above but using toluene in place of water to give polybutadiene in 4.83% yield. The infrared analysis shows that the polymer consists of 72.4% trans-1,4 structure, 0.8% cis-1,4 structure and 26.8% 1,2 structure.

In this example, each content of the trans-1,4 structure (T), the vis-1,4 structure (C) and the 1,2 structure (V) in the polymer is determined by measuring the absorbance at 965, 909 and 724 cm.$^{-1}$ in the infrared spectrum and calculating according to the following equations in which the extinction coefficients are described in Chem. Ind., 41, 758 (1959) by D. Morero:

$$D_{965}=2.33T+0.828V+0.0609C$$
$$D_{909}=2.67V+0.0107C$$
$$D_{724}=0.0231V+0.573C$$

EXAMPLE 10

In a glass tube, there is charged a mixture of nickel peroxide (1 g.), aluminum trichloride (0.532 g.) and benzene (5 ml.). After evacuation, liquefied butadiene (5 ml.) is distilled therein under reduced pressure. The glass tube is sealed and then shaken at 60° C. for 1 hour. The reaction product is treated as in Example 9 to give polybutadiene in 100% yield. The infrared analysis shows that the polymer consists of 16.8% trans-1,4 structure, 83.1% cis-1,4 structure and trace 1,2 structure.

EXAMPLE 11

In a glass tube, there is charged a mixture of nickel peroxide (1 g.), vanadium tetrachloride (1.93 g.) and benzene (5 ml.). After evacuation, liquefied butadiene (5 ml.) is distilled therein under reduced pressure. The glass tube is sealed and then shaken at 60° C. for 40 minutes. The reaction product is treated as in Example 9 to give polybutadiene in 50.5% yield. The infrared analysis shows that the polymer consists of 1.7% trans-1,4 structure, 95.0% cis-1,4 structure and 3.3% 1,2 structure.

EXAMPLE 12

The polymerization is effected as in Example 11 but using a reductive metal salt or another acidic metal halide in place of vanadium tetrachloride for a certain time to give polybutadiene. The results are shown in the following Table 5:

TABLE 5

| Metallic compound | | Polymerization time, Hour | Yield, Percent | Polymer | | |
|---|---|---|---|---|---|---|
| Chemical formula | Amount used, g. | | | trans-1,4, Percent | cis-1,4, Percent | 1,2, Percent |
| $AlCl_3$ | 0.266 | 0.5 | 46.5 | 49.21 | 45.88 | 4.91 |
| $AlCl_3$ | 1.068 | 2 | 100 | 24.70 | 75.30 | Trace. |
| $AlCl_3$ | 2.660 | 5 | 100 | 33.02 | 66.98 | Trace. |
| $AlBr_3$ | 1.814 | 0.16 | 60.0 | 42.21 | 56.73 | 1.06 |
| $AlF_3$ | 0.840 | 0.16 | 25.1 | 25.95 | 71.69 | 2.36 |
| $TiCl_4$ | 1.897 | 2.0 | 76.3 | 61.36 | 31.23 | 7.41 |
| $BF_4 \cdot Et_2O$ | 0.678 | 17 | 100 | 64.05 | 32.42 | 3.53 |
| $AgCl$ | 1.433 | 17 | 54.6 | 31.23 | 60.20 | 8.57 |
| $AgNO_3$ | 1.699 | 4 | 44.2 | 20.44 | 78.01 | 1.55 |

What is claimed is:

1. A polymerizaiton process which comprises contacting one or more kinds of polymerizable α-olefinically unsaturated organic compound with nickel peroxide in the presence of at least one of water, a reductive metal salt and an acidic metal halide.

2. The process according to claim 1, wherein the nickel peroxide is the one prepared by treating a nickel salt with a strong oxidizing agent in an aqueous alkaline medium, collecting the precipitate and drying the collected material.

3. The process according to claim 1, wherein one or more kinds of said polymerizable monomers are contacted with nickel peroxide in the presence of water.

4. The process according to claim 1, wherein one or more kinds of said polymerizable monomers are contacted with nickel peroxide in the presence of a reductive metal salt in water.

5. The process according to claim 1, wherein one or more kinds of said polymerizable monomers are contacted with nickel peroxide in the presence of an acidic metal halide in a hydrocarbon.

6. A process for polymerization of vinyl chloride to poly(vinyl chloride) in a high rate of polymerization which comprises contacting vinyl chloride with nickel peroxide in water containing or not a reductive metal salt, the nickel peroxide being the one prepared by treating a nickel salt with a strong oxidizing agent in an aqueous alkaline medium, collecting the precipitate and drying the collected material.

References Cited

UNITED STATES PATENTS 3,384,630   5/1968   Konatsu _____ 260—94.3

JOSEPH L. SCHOFER, Primary Examiner

J. A. DONAHUE, JR., Assistant Examiner

U.S. Cl. X.R.

260—63, 66, 82.1, 82.3 85.5, 86.1, 86.7, 87.5, 87.7, 89.1, 89.3, 89.7, 91.1, 91.7, 92.1, 93.5, 94.3, 94.9